United States Patent
Jung (10) Patent No.: US 11,180,182 B2
(45) Date of Patent: Nov. 23, 2021

(54) STEERING APPARATUS OF VEHICLE

(71) Applicants: HYUNDAI MOTOR COMPANY, Seoul (KR); KIA MOTORS CORPORATION, Seoul (KR)

(72) Inventor: Dae Suk Jung, Gwacheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 40 days.

(21) Appl. No.: 16/850,621

(22) Filed: Apr. 16, 2020

(65) Prior Publication Data

US 2021/0039708 A1    Feb. 11, 2021

(30) Foreign Application Priority Data

Aug. 7, 2019    (KR) .......................... 10-2019-0095872

(51) Int. Cl.
*B62D 3/12*    (2006.01)

(52) U.S. Cl.
CPC .................................... *B62D 3/126* (2013.01)

(58) Field of Classification Search
CPC ........ B62D 3/126; B62D 3/12; B62D 5/0403; B62D 21/11; F16B 37/045; F16B 5/02
See application file for complete search history.

(56) References Cited

U.S. PATENT DOCUMENTS

| 6,189,902 | B1* | 2/2001 | Lenzen, Jr. | B62D 3/12 |
| | | | | 280/93.515 |
| 10,953,922 | B2* | 3/2021 | Sakai | B62D 7/16 |
| 2017/0225708 | A1* | 8/2017 | Lee | B62D 1/02 |
| 2018/0093694 | A1* | 4/2018 | Suzuki | B62D 21/02 |
| 2018/0273088 | A1* | 9/2018 | Offerle | B62D 25/00 |
| 2020/0307697 | A1* | 10/2020 | Takahashi | B62D 21/06 |

FOREIGN PATENT DOCUMENTS

| CN | 112092897 A | * | 12/2020 | ............... B62D 3/12 |
| DE | 102014216445 A1 | * | 2/2016 | ............... B62D 3/12 |
| KR | 20160041484 A | * | 4/2016 | |
| WO | WO-2019031148 A1 | * | 2/2019 | ............... F16B 5/02 |

* cited by examiner

*Primary Examiner* — Paul N Dickson
*Assistant Examiner* — Matthew D Lee
(74) *Attorney, Agent, or Firm* — McDonnell Boehnen Hulbert & Berghoff LLP (57) ABSTRACT

Disclosed is a steering apparatus of a vehicle in which a rack housing of a gear box may be accurately mounted on a vehicle body part without coming off, and when an angle difference of the vehicle body part is present, the angle difference may be compensated for when the rack housing is mounted. The steering apparatus has a mounting structure configured to fixedly mount the rack housing on the vehicle body part. The mounting structure includes a coupling part formed on the rack housing and having a coupling hole, a mounting part provided on the vehicle body part and having a mounting hole, a nut pipe installed at the mounting part and provided with an insertion part, a washer coupled to an outer circumference of the insertion part, and a bolt inserted into the coupling hole, the washer and the mounting hole and threadedly engaged with the nut pipe.

8 Claims, 5 Drawing Sheets

PRIOR ART

FIG. 7

PRIOR ART

FIG. 8

PRIOR ART

STEERING APPARATUS OF VEHICLE

CROSS-REFERENCE TO RELATED APPLICATION

This application claims under 35 U.S.C. § 119(a) the benefit of priority to Korean Patent Application No. 10-2019-0095872 filed on Aug. 7, 2019, the entire contents of which are incorporated herein by reference.

BACKGROUND

(a) Technical Field

The present disclosure relates to a steering apparatus of a vehicle. More particularly, to a steering apparatus of a vehicle in which a rack housing of a gear box may be accurately mounted on a vehicle body part without coming off, and when an angle difference of the vehicle body part is present, the angle difference may be compensated for when the rack housing is mounted.

(b) Background Art

In general, a steering apparatus is an apparatus that enables a driver to change the driving direction of a vehicle depending on his/her intention, i.e., an apparatus which rotates vehicle wheels so that the driver drives the vehicle in a desired direction.

In a known steering apparatus, force which a driver applies to operate a steering wheel, i.e., steering torque, is transferred to vehicle wheels via a gear box including a rack-and-pinion structure, thus rotating the vehicle wheels.

Recently, a motor-driven power steering system has been developed and used, and the motor-driven power steering system supplements driver's steering torque through a motor and enables a driver to easily operate a steering wheel.

In the motor-driven power steering system, elements for transmitting the driver's steering torque applied through the steering wheel and supplementary steering torque generated by the motor may include a steering column which is installed under the steering wheel, a gear box which converts rotating force transmitted by the steering column into a linear moving force and changes the direction of vehicle wheels, and a universal joint which transmits rotating force from the steering column to the gear box.

Here, the gear box may include a pinion gear which receives rotating force from the universal joint, and a rack bar having a rack engaged with the pinion gear.

In the gear box, when the pinion gear is rotated, the rack bar linearly moves right and left due to the rack, force acting due to linear movement of the rack bar is transmitted to the vehicle wheels through tie rods and ball joints, thus changing the direction of the vehicle wheels.

In the steering apparatus, a rack housing of the gear box is coupled to a vehicle body, particularly to a sub-frame of the vehicle, and since it is difficult to precisely manage a height, an angle, etc. of mounting parts of the sub-frame due to characteristics of a process of manufacturing the sub-frame, the rack housing coupled to the sub-frame may be bent or damaged and thus cause noise, steering failure, etc.

Figure 6:
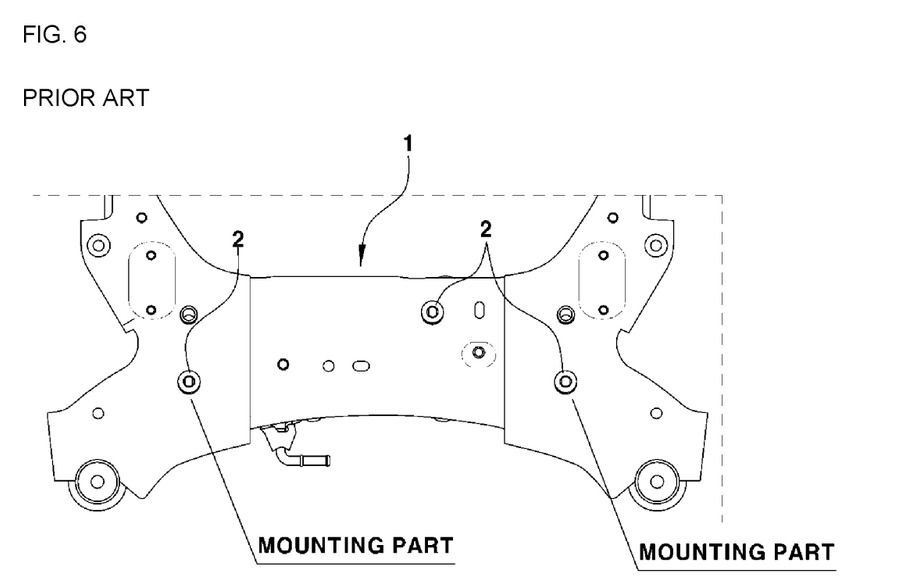
FIG. 6 is a plan view illustrating a sub-frame to which a rack housing of a gear box of a conventional steering apparatus is coupled.

FIG. 6 is a plan view of a sub-frame 1 to which a rack housing of a gear box is coupled, and illustrates a plurality of mounting parts of the sub-frame 1 to which the rack housing is coupled.

FIG. 6 exemplarily illustrates a three-point mounting manner in which the rack housing of the gear box for steering apparatuses is coupled and fixed to the sub-frame 1 of a vehicle at three points thereof.

As shown in this figure, a plurality of mounting parts is set on the sub-frame 1, and nut members having a pipe shape, i.e., nut pipes 2, are installed at the mounting parts.

Figure 7:
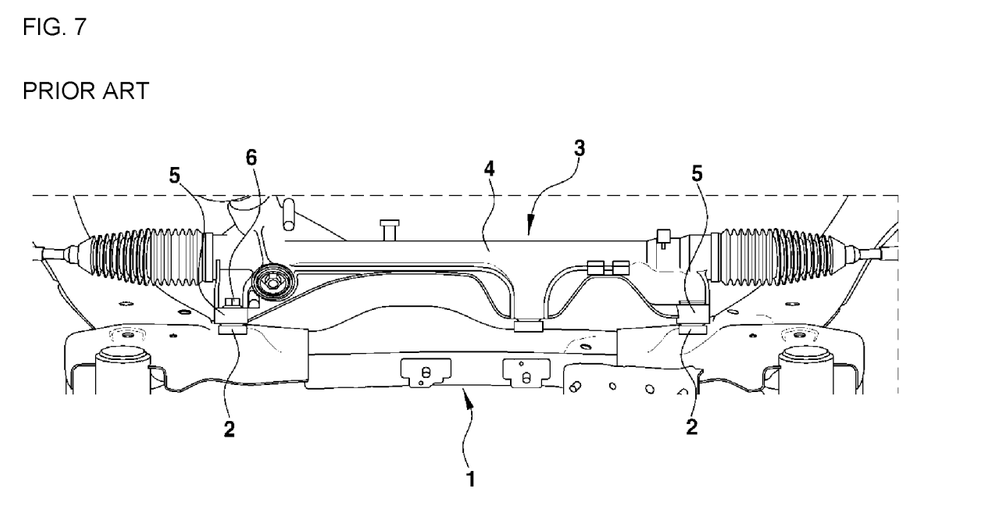
FIG. 7 is a perspective view illustrating a state in which the rack housing of the gear box of the conventional steering apparatus is mounted on the sub-frame.
Figure 8:
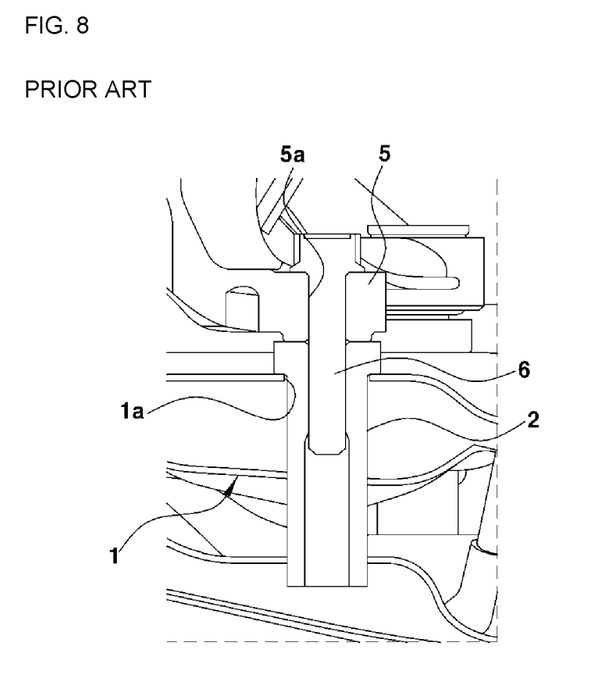
FIG. 8 is a cross-sectional view illustrating a mounting structure of the gear box of the conventional steering apparatus.

FIG. 7 is a perspective view exemplarily illustrating a state in which the gear box 3 is mounted on the sub-frame 1, and FIG. 8 is a cross-sectional view exemplarily illustrating a mounting structure.

As shown in FIG. 8, the nut pipe 2 is installed at each of the mounting parts of the sub-frame 1 through welding, and coupling parts 5, coupled to the mounting parts of the sub-frame 1 by bolts are formed on a rack housing 4 of the gear box 3.

The nut pipe 2 is a pipe-type nut member having a hollow formed therein such that a screw thread is formed in the inner circumferential surface thereof, a hole 1a is formed at each of the mounting parts of the sub-frame 1, and the nut pipe 2 is inserted into the hole 1a and is then welded to the mounting part of the sub-frame 1.

The coupling parts 5 of the rack housing 4 are formed at positions corresponding to the mounting parts of the sub-frame 1, coupling holes 5a of the coupling parts 5 are aligned with the hollows of the nut pipes 2 in a state in which the coupling parts 5 are placed on the nut pipes 2 of the corresponding mounting parts, and then the bolts 6 are inserted into the coupling holes 5a from above and are threadedly engaged with the inner circumferential surfaces of the hollows of the nut pipes 2.

Here, since the mounting parts of the sub-frame 1 and the coupling parts 5 of the rack housing 4 are provided in a plural number, after the hollow of one nut pipe 2 and one coupling hole 5a are first aligned with each other and set as reference holes and the bolt 6 is engaged with these reference holes, the bolts 6 are engaged with the remaining nut pipes 2 and the remaining coupling parts 5.

However, when a height difference or an angle difference among the respective portions of a sub-frame is present, if the three-point mounting manner in which the number of mounting points is reduced from four to three is applied, a degree of coming-off between a rack housing of a gear box and the sub-frame may be reduced compared to a four-point mounting manner, but the angle difference present in the sub-frame may not be compensated for.

Therefore, an improved mounting structure, which may compensate for an angle difference in a sub-frame while preventing a gear box from coming off the sub-frame, is required.

Further, it is conventionally known that, when a rack housing is mounted on a sub-frame, a solid mounting method, i.e., a direct coupling method between the rack housing and the sub-frame, and a bush structure for compensating for tolerance of the sub-frame are used together.

That is, both the solid mounting method, in which the rack housing is directly coupled to the sub-frame through nut pipes, and the bush structure for compensating for and overcoming tolerance (a height difference or an angle difference) of the sub-frame are used.

In use of both the solid mounting method and the bush structure, '2-point solid mounting+2-point bushes' is applied in the case of the four-point mounting manner, and '2-point solid mounting+1-point bush' is applied in the case of the three-point mounting manner.

However, if the bush structure is applied, friction characteristics in steering may be improved, but responsiveness in steering may be lowered.

That is, if the solid mounting method alone is applied, a direct feeling in steering and responsiveness in steering are excellent, but the rack housing may be deformed due to tolerance of the sub-frame and thus friction behavior in steering will deteriorate. In order to overcome these problems, even if the bush structure is applied together with the solid mounting method, friction problems may be improved, but a direct feeling and responsiveness in steering may be insufficient. Therefore, an improved mounting structure, which may both reduce friction and improve a direct feeling in steering, is desirable.

Further, the bush structure may increase material costs and manufacturing costs, in addition to lowering responsiveness in steering.

SUMMARY OF THE DISCLOSURE

The present disclosure has been made in an effort to solve the above-described problems associated with the prior art, and it is an object of the present disclosure to provide a steering apparatus of a vehicle in which a rack housing of a gear box may be accurately mounted on a vehicle body part without coming off, and when an angle difference of the vehicle body part is present, the angle difference may be compensated for when the rack housing is mounted.

It is another object of the present disclosure to provide a steering apparatus of a vehicle having a mounting structure which may reduce steering friction and improve a direct feeling and responsiveness in steering while solving problems caused by a mounting structure using bushes for compensating for tolerance of a sub-frame, i.e., lowering of responsiveness and increased material costs, and contribute to an improvement in steering feel and steering performance.

In one aspect, the present disclosure provides a steering apparatus of a vehicle having a mounting structure configured to fixedly mount a rack housing of a gear box on a vehicle body part, the mounting structure including a coupling part formed on the rack housing of the gear box and having a coupling hole formed therein, a mounting part provided on the vehicle body part and having a mounting hole formed therein, a nut pipe installed at the mounting part and provided with an insertion part formed at an end thereof so as to pass through the mounting hole of the mounting part, a washer coupled to an outer circumference of the insertion part passing through the mounting hole and protruding upwards from an upper surface of the mounting part, and a bolt inserted into the coupling hole of the coupling part, the washer, and the mounting hole of the mounting part so as to sequentially pass therethrough, in a state in which the coupling part is seated on the washer, and threadedly engaged with the nut pipe.

In an embodiment, the insertion part may be formed to have a shape extending from the end of the nut pipe in a length direction of the nut pipe, and have a smaller outer diameter than other parts of the nut pipe.

In another embodiment, a groove configured to receive the insertion part inserted therein may be formed in a lower portion of an inner circumferential surface of the washer.

In still another embodiment, the groove may be formed along an overall circumference of the lower portion of the inner circumferential surface of the washer, and the insertion part may be formed to have a circular shape so as to be inserted into the groove of the washer.

In yet another embodiment, a lower surface of the coupling part may be formed as a concave curved surface having a designated curvature, and an upper surface of the washer may be formed as a convex curved surface having another designated curvature.

In still yet another embodiment, the lower surface of the coupling part and the upper surface of the washer may have the same curvature.

In a further embodiment, the washer may have a ring shape having an opening formed in one side thereof.

In another further embodiment, an inner diameter of the coupling hole of the coupling part through which the bolt passes may be greater than an outer diameter of a body of the bolt.

Other aspects and embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 5 is a cross-sectional view exemplarily illustrating the mounting structure of the gear box of the steering apparatus in accordance with one embodiment of the present disclosure, in a mounting state in which a step is compensated for;

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

In the following description of the embodiments, it will be understood that, when a part "includes" an element, the part may further include other elements but does not exclude the presence of other elements unless stated otherwise.

Figure 1:
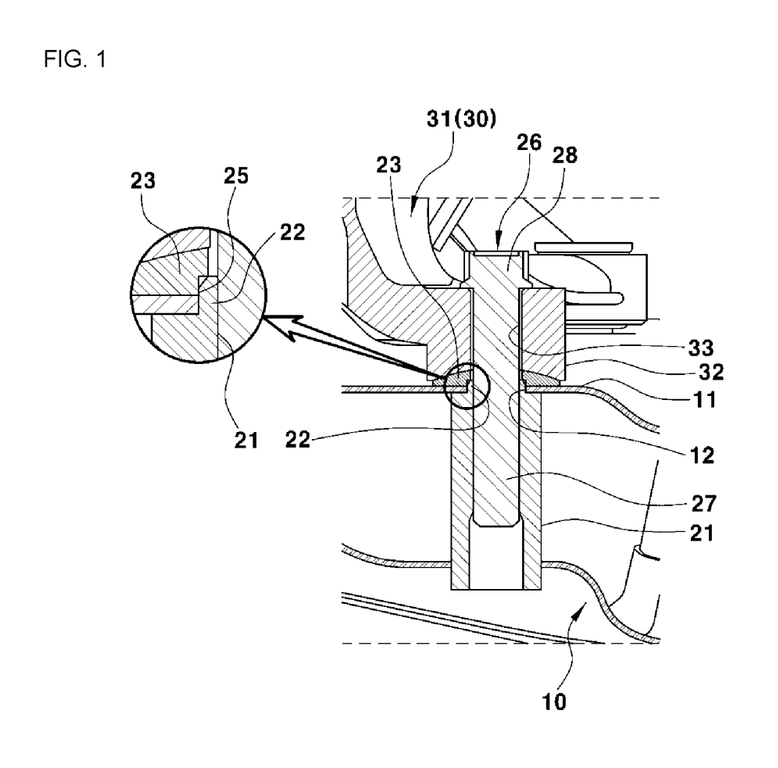
FIG. 1 is a cross-sectional view illustrating a mounting structure of a gear box of a steering apparatus in accordance with one embodiment of the present disclosure.

FIG. 1 is a cross-sectional view illustrating a mounting structure of a gear box of a steering apparatus in accordance with one embodiment of the present disclosure. Here, reference numeral 31 indicates a rack housing of a gear box 30, and reference numeral 10 indicates a vehicle body part, i.e., a sub-frame, on which the rack housing 31 is mounted.

Figure 2:
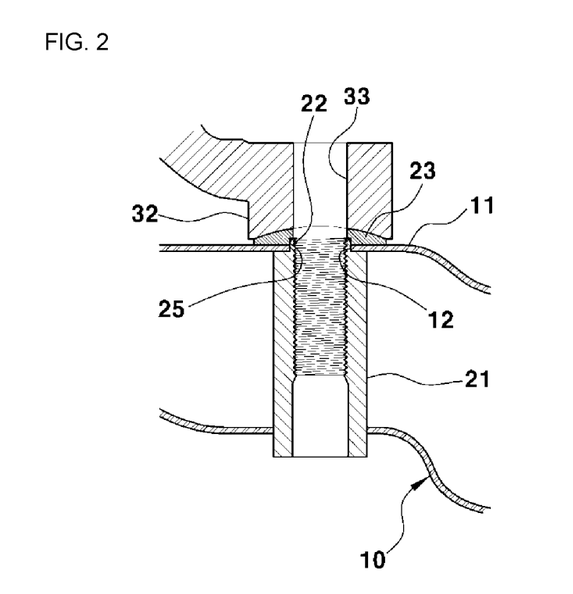
FIG. 2 is a cross-sectional view separately illustrating a nut pipe and a washer for mounting the gear box of the steering apparatus in accordance with one embodiment of the present disclosure.

FIG. 2 is a cross-sectional view separately illustrating a nut pipe 21, i.e., a pipe-type nut member for mounting the gear box 30, and a washer 23 coupled to the nut pipe 21 in the steering apparatus in accordance with one embodiment of the present disclosure.

Figure 3:
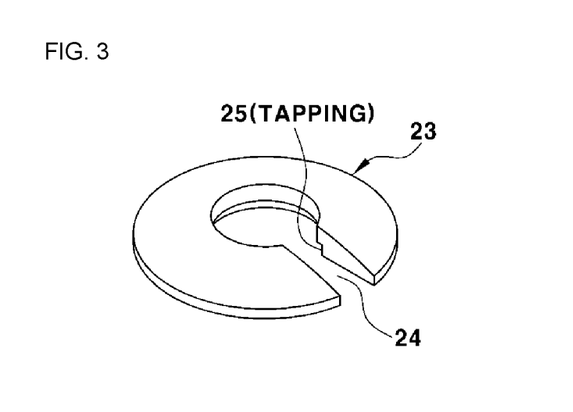
FIG. 3 is a perspective view of the washer for mounting the gear box in the steering apparatus in accordance with one embodiment of the present disclosure.
Figure 4:
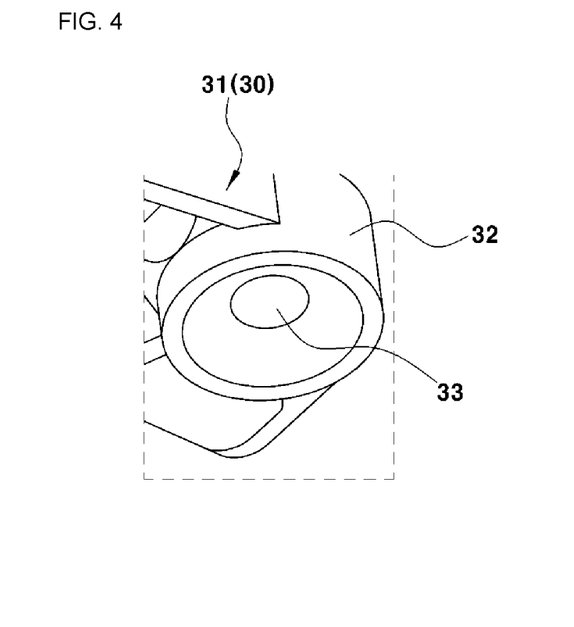
FIG. 4 is a perspective view of a coupling part of a rack housing of the steering apparatus in accordance with one embodiment of the present disclosure.

FIG. 3 is a perspective view of the washer 23 for mounting the gear box 30 in the steering apparatus in accordance with one embodiment of the present disclosure, and FIG. 4 is a perspective view of a coupling part 32 of the rack housing 31 of the steering apparatus in accordance with one embodiment of the present disclosure.

As shown in FIGS. 1 to 4, the coupling parts 32, which are mounted on and coupled to mounting parts 11 of a vehicle body part, particularly of a sub-frame 10, are formed on the rack housing 31 of a gear box 30.

Each of the coupling parts 32 has a coupling hole 33 through which a bolt 26 passes to be inserted thereinto, and the respective coupling parts 32 of the rack housing 31 are coupled to the respective mounting parts 11 of the sub-frame 10 by the bolts 26.

Further, as shown in FIGS. 1 and 2, mounting holes 12 are formed at the mounting parts 11 of the sub-frame 10, and nut pipes 21 are fixedly installed in the mounting holes 12.

Here, the sub-frame 10 is manufactured using a weldable material, such as a steel alloy, and welding is carried out in a state in which upper ends of the nut pipes 21 are coupled to the mounting holes 12 formed at the mounting parts 11 of the sub-frame 10.

For this purpose, the nut pipes 21 are manufactured using a weldable material, such as a steel alloy, in the same manner as the sub-frame 10.

The nut pipe 21 is a pipe-type nut member, the inner circumferential surface of which is provided with a screw thread formed thereon so that the bolt 26 is inserted thereinto so as to be threadedly engaged therewith.

Further, an insertion part 22 having a smaller outer diameter than other parts of the nut pipe 21 and extending in a length direction is formed at an end of the nut pipe 21 coupled to the mounting hole 12 of the mounting part 11 of the sub-frame 10, i.e., the upper end of the nut pipe 21 in the drawings.

The insertion part 22 has a circular shape and has a smaller outer diameter than the other parts of the nut pipe 21, and thus forms a stepwise outer circumferential surface shape with the other parts of the nut pipe 21.

Further, the insertion part 22 of the nut pipe 21 has a size such that it is capable of being inserted into the mounting hole 12 of the sub-frame 10, and particularly a size such that the outer circumferential surface thereof may contact the inner circumferential surface of the mounting hole 12.

More particularly, the insertion part 22 of the nut pipe 21 may have an outer circumferential surface which may be inserted into the mounting hole 12 of the sub-frame 10 by press fitting.

Further, the insertion part 22 of the nut pipe 21 has a length sufficient to protrude the tip of the insertion part 22 upwards from the upper surface of the mounting part 11 of the sub-frame 10 in the state in which the insertion part 22 of the nut pipe 21 is inserted into the mounting hole 12 of the sub-frame 10 so as to pass therethrough.

Therefore, in the state in which the insertion part 22 of the nut pipe 21 is inserted into the mounting hole 12 of the sub-frame 10 so as to pass therethrough, the tip of the insertion part 22 protrudes upwards from the upper surface of the mounting part 11 of the sub-frame 10.

Further, in the state in which the insertion part 22 of the nut pipe 21 is inserted into the mounting hole 12 of the sub-frame 10, an end of the nut pipe 21 having the insertion part 22, i.e., the upper end of the nut pipe 21 in the drawings, is welded to the mounting part 11 of the sub-frame 10.

During welding, in the state in which the insertion part 22 of the nut pipe 21 is inserted into the mounting hole 12 of the sub-frame 10, the upper end of the nut pipe 21 is welded to a part of the sub-frame 10 around the mounting hole 12, i.e., the mounting part 11 around the mounting hole 12.

Thereby, the nut pipes 21 may be fixed to the mounting parts 21 of the sub-frame, and the coupling parts 32 of the rack housing 31 in a state of being mounted on the mounting parts 11 of the sub-frame 10 may be coupled to the mounting parts 11 of the sub-frame 10 by the nut pipes 21 and the bolts 26.

In the present disclosure, the washer 23 is installed on the upper surface of the mounting part 11 of the sub-frame 10, the coupling part 32 of the rack housing 31 is seated on the upper surface of the washer 23, and, in this state, the bolt 26 sequentially passes through the coupling hole 31, the washer 23 and the mounting hole 12 and is then threadedly engaged with the nut pipe 21.

Thereby, the coupling part 32 of the rack housing 31, which is seated on the upper surface of the washer 23, may be fixedly coupled to the mounting part 11 of the sub-frame 10 by the bolt 26 and the nut pipe 21.

Further, as shown in FIG. 3, the washer 23, which is a circular ring-type member, may have a ring shape, one side of which is open, i.e., a ring shape having an opening 24 formed in one side thereof, and the opening 24 of the washer 23 serves to reduce generation of stress in the coupling part 32 due to the washer 23 while enabling deformation of the washer 23.

The upper surface of the washer 23 is a curved surface having a designated curvature, and this upper surface of the washer 23 serves as a surface on which the coupling part 32 of the rack housing is seated.

As shown in FIG. 4, the lower surface of the coupling part 32 of the rack housing 31 is a curved surface which is concave, and this concave lower surface of the coupling part 32 may be seated on the convex upper surface of the washer 23 so that they are pressed against each other.

Here, the upper surface of the washer 23 and the lower surface of the coupling part 32 of the rack housing 31 seated thereon are curved surfaces, each of which has a predetermined curvature, and the curvatures of both curved surfaces are set such that the upper surface of the washer 23 and the lower surface of the coupling part 32 may be pressed against each other and contact each other to have as wide a contact area as possible.

Further, the inner diameter of the washer 23 and the outer diameter of the insertion part 22 may be set so that the washer 23 may be coupled to the outer circumference of the insertion part 22, passing through the mounting hole 12 of the sub-frame 10, by interference fitting and may then be fixed.

Therefore, when the washer 23 in a state of being seated on the upper surface of the mounting part 11 of the sub-frame 10 is coupled to the outer circumference of the insertion part 22 of the nut pipe 21 protruding upwards from the upper surface of the mounting part 11 by interference fitting, the washer 23 maintains the fixed state thereof without separating from the insertion part 22 of the nut pipe 21 before force sufficient to remove the washer 23 is applied.

In one embodiment, a groove 25 having a size such that the insertion part 22 may be inserted therein may be formed along the overall circumference of a lower portion of the inner circumferential surface of the washer 23.

Here, the groove 25 having a size such that the insertion part 22 may be inserted therein may be formed at the lower portion of the inner circumferential surface of the washer 23 through tapping.

Thereby, when the nut pipe 21 is fixed to the mounting part 11 of the sub-frame 10 through welding, the insertion part 22 of the nut pipe 21 passing through the mounting hole 12 of the sub-frame 10 may protrude upwards from the upper surface of the mounting part 11, and the washer 23 may be fixed to the outer circumference of the protruding insertion part 22.

In this state, when the coupling part 32 of the rack housing 31 is seated on the upper surface of the washer 23 and the bolt 26 passes through the coupling hole 31 of the coupling part 32 and the washer 23 and is threadedly engaged with the inside of the nut pipe 21, the coupling part 32 of the rack housing 31 and the mounting part 11 of the sub-frame 10 are coupled to each other by the nut pipe 21, the washer 23 and the bolt 26.

Further, when the coupling parts 32 of the rack housing 31 and the mounting parts 11 of the sub-frame 10 are coupled by the nut pipes 21, the washers 23 and the bolts 26 under the condition that the coupling parts 32 are seated on the mounting parts 11, the rack housing 31 of the gear box 30 may be fixedly mounted on the sub-frame 10.

As such, in the present disclosure, before the rack housing 31 of the gear box 30 is mounted on the sub-frame 10, the washers 23 may be in advance assembled with the respective mounting parts 11 of the sub-frame 10 in a manner in which the washers 23 are inserted into the insertion parts 22 of the nut pipes 21, and thus, the rack housing 31 may be placed on the sub-frame 10 in the state in which the washers 23 are fixed to all of the respective mounting parts 11.

Accordingly, in the mounting structure of the steering apparatus in accordance with the present disclosure, the insertion part 22 formed at the nut pipe 21 serves to prevent the washer 23 from being separated from the nut pipe 21 during assembly, thus being capable of facilitating assembly work (work of mounting the gear box 30) and improving workability.

Further, in the steering apparatus in accordance with the present disclosure, the rack housing 31 of the gear box 30 may be manufactured through aluminum die casting, and be coupled to the sub-frame 10 so as to be mounted on the sub-frame 10 by the nut pipes 21, the washers 23 and the bolts 26.

In the present disclosure, the mounting parts 11 of the sub-frame 10 and the coupling parts 32 of the rack housing 31 may be provided at a plurality of predetermined positions, and for example, in the three-point mounting manner, the rack housing 31 may be mounted on the sub-frame 10 by three mounting parts 11 and three coupling parts 32.

Further, in the four-point mounting manner, the rack housing 31 may be mounted on the sub-frame 10 by four mounting parts 11 and four coupling parts 32.

Here, the nut pipes 21 are installed at the respective mounting parts 11 of the sub-frame 10, and in the state in which the respective coupling parts 32 of the rack housing 31 are seated on the washers 23 installed at the respective mounting parts 11, the bolts 26 are inserted into the coupling holes 33 of the respective coupling parts 32, the washers 23 and the mounting holes 12 and are then threadedly engaged with the nut pipes 21.

In the steering apparatus of the present disclosure, if the rack housing 31 of the gear box 30 is fixed to the sub-frame 10 in the three-point mounting manner, the above-described mounting structure may be applied to all of the three points.

Here, if the above-described mounting structure including the nut pipe 21, the washer 23 and the bolt 26 is applied to all of the three points, the coupling parts 32 of the rack housing 31 may be fixedly mounted on the mounting parts 11 of the sub-frame 10 without coming off at all three points.

Further, in the steering apparatus of the present disclosure, if the rack housing 31 of the gear box 30 is fixed to the sub-frame 10 in the four-point mounting manner, the above-described mounting structure including the nut pipe 21, the washer 23 and the bolt 26 is applied to all four points.

As such, in the steering apparatus of the present disclosure, the above-described mounting structure to mount the rack housing 31 of the gear box 30 on the sub-frame 10 may be applied to both the three-point mounting manner and the four-point mounting manner.

Further, because the above-described mounting structure may be applied to all of the three mounting parts or the four mounting parts, use of bushes is unnecessary.

In accordance with one embodiment, the coupling hole 33 formed through the coupling part 32 of the rack housing 31 so that the bolt 26 is inserted into the coupling hole 33 may have an inner diameter which is greater than the inner diameter of the hollow of the nut pipe 21 and the outer diameter of a body 27 of the bolt 26 by a predetermined size.

Here, a screw thread is formed on the body 27 of the bolt 26, and is threadedly engaged with the inner surface of the nut pipe 21.

Figure 5:
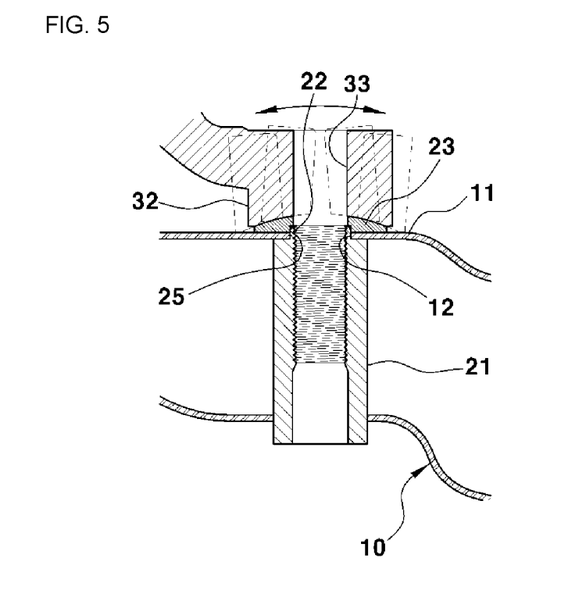

FIG. 5 is a cross-sectional view exemplarily illustrating the mounting structure of the gear box 30 of the steering apparatus in accordance with one embodiment of the present disclosure, in a mounting state in which a step is compensated for.

When the inner diameter of the coupling hole 33 is greater than the inner diameter of the hollow of the nut pipe 21 and the outer diameter of the body 27 of the bolt 26, the coupling part 32 of the rack housing 31 may slide on the upper surface of the washer 23, as shown in FIG. 5, before the bolt 26 passing through the coupling hole 33 of the rack housing 30 is completely coupled to the nut pipe 21.

Of course, when the bolt 26 is completely coupled to the nut pipe 21 by maximally rotating the bolt 26 so that a head 28 of the bolt 26 maximally pressurizes the upper surface of the coupling part 32 of the rack housing 31, the coupling part 32 is completely fixed to the washer 23 so as not to slide on the upper surface of the washer 23.

However, before the bolt 26 becomes in a completely coupled state in which the head 28 of the bolt 26 maximally pressurizes the coupling part 32, the coupling part 32 of the rack housing 31 may rotatably slide on the upper surface of the washer 23.

Further, by setting the inner diameter of the coupling hole 33 of the coupling part 32 to be greater than the inner diameter of the hollow of the nut pipe 21 and the outer diameter of the body 27 of the bolt 26 by the predetermined size, the bolt 26 inserted into the coupling hole 33 to pass through the coupling hole 31 may be relatively rotated and tilted in the coupling part 32.

Thereby, when a height difference or an angle difference is present among the mounting parts 11 of the sub-frame 10, the height difference or the angle difference may be compensated for by completely coupling the bolt 26 to the nut pipe 21 in a state in which the angle of the coupling part 32 is adjusted by sliding the coupling part 32 of the rack housing 31 on the upper surface of the washer 23 fixed to the upper surface of the mounting part 11 of the sub-frame 10.

In the present disclosure, the bolt 26 is inserted into the hollow of the nut pipe 21 and is threadedly engaged with the nut pipe 21 through the screw threads of the bolt 26 and the nut pipe 21, and the bolt 26 in the engaged state serves to apply axial force to the coupling part 32 of the rack housing 31.

The bolt 26 may be manufactured using a material, such as a steel alloy, etc., and include the body 27 which is inserted into the nut pipe 21 to be threadedly engaged therewith, and the head 28 formed at the end of the body 27.

In the present disclosure, the upper surface of the washer 23 may be a curved surface which is convex so as to match and correspond to the concave lower surface of the coupling part 32, so that the lower surface of the coupling part 32 of the rack housing 31 may be in contact with the upper surface of the washer 23 to be pressed against the upper surface of the washer 23, as described above.

Here, the upper surface of the washer 23 and the lower surface of the coupling part 32 may be curved surfaces having a complimentary curvature so that they may contact each other and be pressed against each other.

Therefore, as the washer 23 fixed to the mounting part 11 of the sub-frame 10 and the coupling part 32 of the rack housing 31 seated on the washer 23 slide against each other, relative rotation, tilting and posture adjustment of the washer 23 and the coupling part 32 which contact each other is possible.

Consequently, in the steering apparatus in accordance with the present disclosure, when the rack housing 31 of the gear box 30 is mounted on the sub-frame 10, a height difference and an angle difference among the mounting parts 11 of the sub-frame 10 and other tolerances of the sub-frame 10 may be compensated for by the above-described mounting structure.

As described above, the lower surface of the coupling part 32 of the rack housing 31 and the upper surface of the washer 23 may be curved surfaces having approximately the same curvature so that the lower surface of the coupling part 32 may be pressed against the upper surface of the washer 23 when the rack housing 31 of the gear box 30 is mounted on the sub-frame 10.

Further, as described above, the washer 23 may be manufactured to have a circular ring shape, one side of which is open, i.e., a ring shape having the opening 24 formed in one side thereof.

For this purpose, the washer 23 may be primarily manufactured to have a ring shape, and then the opening 24 may be formed by cutting an intermediate part of the ring-type washer 23.

If the opening 24 is formed by cutting the intermediate part of the ring-type washer 23, the opening 24 may induce deformation of the washer 23 in a circumferential direction when great external force of a designated level or more is applied to the washer 23.

If great external force of the designated level or more is applied to the washer 23 through the coupling part 32 when the bolt 26 is coupled to the nut pipe 21 in the state in which the coupling part 32 of the rack housing 31 is seated on the washer 23, the opening 24 of the washer 23 may induce deformation of the washer 23 in the circumferential direction.

If the washer 23 is deformed in the circumferential direction, stress applied to the coupling part 32 by the washer 23 may be reduced, and thus problems generated due to stress, such as fracture of the coupling part 32, may be prevented.

For example, the upper surface of the washer 23 and the lower surface of the coupling part 32 may have the same curvature, but there may be a difference between the two curvatures due to manufacturing tolerance.

Here, if the curvature of the upper surface of the washer 23 is smaller than the curvature of the lower surface of the coupling part 32, a contact area between the upper surface of the washer 23 and the lower surface of the coupling part 32 is reduced compared to the case in which the two curvatures are the same, and thus problems, such as sense of difference in a steering, may occur.

Further, if the curvature of the upper surface of the washer 23 is greater than the curvature of the lower surface of the coupling part 32, when the coupling part 32 of the rack housing 31 is seated on the washer 23 and is coupled to the washer 23 by the bolt 26, the coupling part 32 of the rack housing 31, formed of an aluminum alloy, may be deformed and exceed the tensile strength of the rack housing 31, and the rack housing 31 may thus fracture.

However, if the opening 24 is formed in one side of the washer 23, the washer 23 may be deformed in the circumferential direction, and the deformation of the washer 23 in the circumferential direction may reduce stress induced in the coupling part 32 of the rack housing 31 due to the washer 23.

The inventor(s) of the present disclosure confirmed through computer analysis that, when a washer having an opening and a washer having no opening are compared, the washer having the opening may reduce stress in a coupling part by about 30% as compared to the washer having no opening.

Here, washers having the same shape and dimensions and differing only as to whether or not an opening is formed therein were analyzed.

When the opening 24 is formed in the washer 23, even though a difference in curvatures between the upper surface of the washer 23 and the lower surface of the coupling part 32 is present, deformation of the washer 23 in the circumferential direction is induced when the coupling part 32 is coupled to the washer 23, and thus a proper contact ratio between the washer 23 and the coupling part 32 may be maintained and a proper contact area therebetween may be secured.

Further, if the opening 24 is formed at the washer 23, precision processing of the upper surface of the washer 23 to secure curvature is not necessary. Therefore, the washer 23 may be manufactured through forging, and thus material costs may be dramatically reduced.

Washers which are manufactured through forging, rather than through precision processing may be mass-produced, thereby enabling cost reduction due to mass production.

Ultimately, the solid mounting method (the direct coupling method without bushes) may be applied to all the mounting parts between the rack housing 31 of the gear box 30 and the sub-frame 10 of the vehicle body, and thus a direct feeling in steering and responsiveness in steering may be improved.

Further, even if the solid mounting method is applied to all the mounting parts, steering friction problems, for example, a feeling of friction, steering restoration performance, and noise, vibration and harshness (NVH) due to steering friction, may not occur.

Particularly, in terms of absorption of manufacturing tolerance of the sub-frame 10, a height difference or an angle difference may be compensated for, and thus, a high level of robustness for differences may be secured, compared to the conventional bush-mounting method.

In addition, in the improved mounting structure of the steering apparatus in accordance with the present disclosure, parts and material costs may be reduced and weight reduction may be achieved, compared to the conventional bush-mounting method.

As is apparent from the above description, in a steering apparatus of a vehicle in accordance with the present disclosure, a convex washer having a designated curvature, on which a coupling part of a rack housing of a gear box may be seated, is used in a structure for mounting the gear box on a sub-frame, and thus, in the mounting structure, relative rotation (or tilting) of parts at a matching area (contact area) among the parts is possible, thereby being capable of compensating for a height difference and an angle difference of the sub-frame.

Further, among elements of the mounting structure of the steering apparatus in accordance with the present disclosure, an insertion part formed at a nut pipe prevents separation of the washer from the nut pipe during assembly, thus being capable of facilitating assembly work (mounting of the gear box) and improving workability.

Moreover, in the steering apparatus in accordance with the present disclosure, the washer has a ring shape having an opening formed in one side thereof, and thus, deformation of the washer in the circumferential direction may be induced when the coupling part of the gear box is coupled to the washer, and thereby stress induced in the coupling part may be reduced.

In addition, the mounting structure of the gear box may improve a direct feeling and responsiveness in steering, and the mounting structure using no bushes may improve steering friction problems caused by use of bushes and achieve cost reduction and weight reduction compared to use of bushes.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A steering apparatus of a vehicle having a mounting structure configured to fixedly mount a rack housing of a gear box on a vehicle body part, the mounting structure comprising:
   a coupling part formed on the rack housing of the gear box and having a coupling hole formed therein;
   a mounting part provided on the vehicle body part and having a mounting hole formed therein;
   a nut pipe installed at the mounting part and provided with an insertion part formed at an end thereof so as to pass through the mounting hole of the mounting part;
   a washer coupled to an outer circumference of the insertion part passing through the mounting hole and protruding upwards from an upper surface of the mounting part; and
   a bolt inserted into the coupling hole of the coupling part, the washer and the mounting hole of the mounting part so as to sequentially pass therethrough, in a state in which the coupling part is seated on the washer, and threadedly engaged with the nut pipe.

2. The steering apparatus of claim 1, wherein the insertion part:
   is formed to have a shape extending from the end of the nut pipe in a length direction of the nut pipe; and
   has a smaller outer diameter than those of other parts of the nut pipe.

3. The steering apparatus of claim 1, wherein a groove configured to receive the insertion part inserted therein is formed in a lower portion of an inner circumferential surface of the washer.

4. The steering apparatus of claim 3, wherein:
   the groove is formed along an overall circumference of the lower portion of the inner circumferential surface of the washer; and
   the insertion part is formed to have a circular shape so as to be inserted into the groove of the washer.

5. The steering apparatus of claim 1, wherein:
   a lower surface of the coupling part is formed as a concave curved surface having a designated curvature; and
   an upper surface of the washer is formed as a convex curved surface having another designated curvature.

6. The steering apparatus of claim 5, wherein the lower surface of the coupling part and the upper surface of the washer have the same curvature.

7. The steering apparatus of claim 5, wherein the washer has a ring shape having an opening formed in one side thereof so that the side of the washer is open through the opening.

8. The steering apparatus of claim 5, wherein an inner diameter of the coupling hole of the coupling part through which the bolt passes is greater than an outer diameter of a body of the bolt.

* * * * *